United States Patent
Allan et al.

(10) Patent No.: US 6,339,455 B1
(45) Date of Patent: Jan. 15, 2002

(54) DIGITAL VIDEO DISC VEHICLE TELEVISION

(76) Inventors: William L. Allan, 13 Oak Dr., Ocala, FL (US) 34472; Ervin R. Pilarczyk, 351 SE. 90th St., Ocala, FL (US) 34480

(*) Notice: Subject to any disclaimer, the term of this patent is extended or adjusted under 35 U.S.C. 154(b) by 0 days.

(21) Appl. No.: 09/474,582

(22) Filed: Dec. 29, 1999

(51) Int. Cl.[7] ................................................. H04H 5/64
(52) U.S. Cl. ...................... 348/837; 296/37.7; 379/110; 352/132; 250/221; 361/685
(58) Field of Search ........................... 348/836, 837; 312/7.2, 248, 223.1; 296/37.7, 37.8; 379/110; 352/132; 250/221; 361/685

(56) References Cited

U.S. PATENT DOCUMENTS

| | | | |
|---|---|---|---|
| 4,079,987 A | * 3/1978 | Bumgardener | 296/37.7 |
| 4,870,676 A | * 9/1989 | Lewo | 379/110 |
| 4,982,996 A | * 1/1991 | Vottero-Fin et al. | 248/917 |
| 4,983,951 A | * 1/1991 | Igarashi et al. | 348/836 |
| 5,096,271 A | * 3/1992 | Portman | 312/7.2 |
| D338,003 S | 8/1993 | Nakayama | |
| D371,357 S | 7/1996 | Nakamura | |
| 5,775,762 A | * 7/1998 | Vitito | 296/37.7 |
| 5,811,791 A | * 9/1998 | Portman | 250/221 |
| 5,822,023 A | * 10/1998 | Suman et al. | 348/837 |
| D410,464 S | 6/1999 | Hakoda | |
| 5,910,882 A | 6/1999 | Burrell | |
| 5,927,784 A | 7/1999 | Vitito | |
| 5,946,055 A | 8/1999 | Rosen | |
| D413,856 S | 9/1999 | Scribner | |

* cited by examiner

Primary Examiner—Peter M. Cuomo
Assistant Examiner—Jerry A. Anderson
(74) Attorney, Agent, or Firm—Edward M. Livingston, Esq.

(57) ABSTRACT

A digital-video-disc vehicle television has a thin ceiling-mountable TV housing (1) having a front edge (2) from which a preferably flat TV screen (3) pivots adjustably downward from a stowage space (4) and having a rear edge (5) with a digital video disc (DVD) slot (6). The TV housing is preferably oval-shaped with a major length of about fifteen inches and a major width of about eight inches. Thickness is about one-to-three inches, depending on type and plurality of components it uses. Intermediate the stowage space and the DVD slot are dome lights (9) that preferably are adjustable for reading and a rearward-facing control panel (7) that preferably has pushbutton control and is backlit. Audiovisual signaling (18, 19) is received selectively from remote or in-vehicle broadcasting sources and from the DVD player (15) and transmitted to a speaker (14) and to the TV screen as controlled by a control unit (17). An FM transmitter (20) is employed to enhance sound received from audio characteristics of the audiovisual signaling and transmitted to the speaker.

22 Claims, 2 Drawing Sheets

DIGITAL VIDEO DISC VEHICLE TELEVISION

BACKGROUND OF THE INVENTION

This invention relates to vehicle-ceiling television with antenna and disc player options.

With known vehicle-ceiling televisions, passengers are limited to broadcast transmission. They do not have a selection of multiple features such as digital video disc players and game-playing capacity arranged conveniently and are not attachable to a vehicle in a manner taught by this invention.

Examples of a known related but different vehicle-ceiling televisions are described in the following patent documents. U.S. Pat. No. 5,946,055, issued to Rosen on Aug. 31, 1999 described a display unit having a planar screen that was downwardly pivotal from a thin planar ceiling frame but did not have a digital video disk player nor an FM transmitter from an onboard receiver as taught by this invention. U.S. Pat. No. 5,927,784, issued to Vitito on Jul. 27, 1999 described a two-piece overhead console different from the single-piece overhead console and not having a digital-video-disk player as taught by this invention. Various known design patents depict slim and artistic car-ceiling units but do not teach a digital video disk player in combination with a downwardly pivotal TV screen, such as U.S. design Pat. No. 413,856, issued to Scribner on Sep. 14, 1999, U.S. Design Pat. No. 410,464 issued to Hakoda on Jun. 1, 1999, and 371,357 issued to Nakamura on Jul. 2, 1996.

SUMMARY OF THE INVENTION

In light of limitations of present vehicle-ceiling television, objects of patentable novelty and utility taught by this invention are to provide a vehicle-ceiling TV in combination with disc-recorded video games, movies and education in addition to lighting that is variable between high for reading and low for minimal vision.

This invention accomplishes these and other objectives with a thin TV ceiling mount having a front edge from which a flat screen pivots adjustably downward from a stowage space and having a rear edge with a digital video disc (DVD) slot. The mount is preferably oval-shaped with a major length of about fifteen inches and a major width of about eight inches. Thickness is about one-to-three inches, depending on type and plurality of components it uses. Intermediate the stowage space and the DVD slot are dome lights that preferably are adjustable for reading brightness and a rearward-facing control panel that preferably has pushbutton control and is backlit. Audiovisual signaling may be received selectively from broadcasting sources and from the DVD player and transmitted to a speaker and to the flat screen as controlled by a control unit. An FM transmitter is employed to enhance sound received from audio characteristics of the audiovisual signaling and transmitted to a vehicle component, such as a speaker.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

| | |
|---|---|
| 1. TV housing | 12. Vehicle electrics |
| 2. Front edge | 13. Battery |
| 3. TV screen | 14. Speaker |
| 4. Stowage space | 15. DVD player |
| 5. Rear edge | 16. Digital video disc |
| 6. Disc slot | 17. Control unit |
| 7. Control panel | 18. Broadcast audiovisual signaling |
| 8. Control member | 19. Player audiovisual signaling |
| 9. Light | 20. FM transmitter |
| 10. Audiovisual receiver | 21. Overhead base |
| 11. Electrical conveyance | 22. Overhead bottom |

Figure 1:
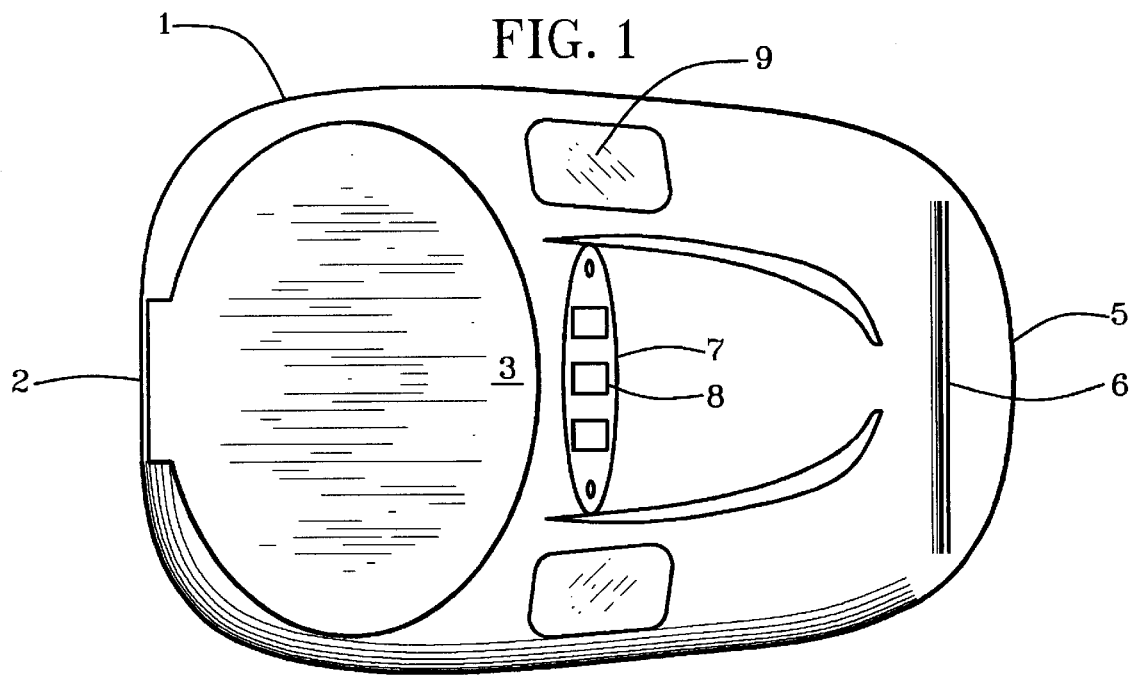
FIG. 1 is a bottom view of a digital-video-disk vehicle television having a top attachable to a vehicle upright such as a ceiling.
Figure 2:
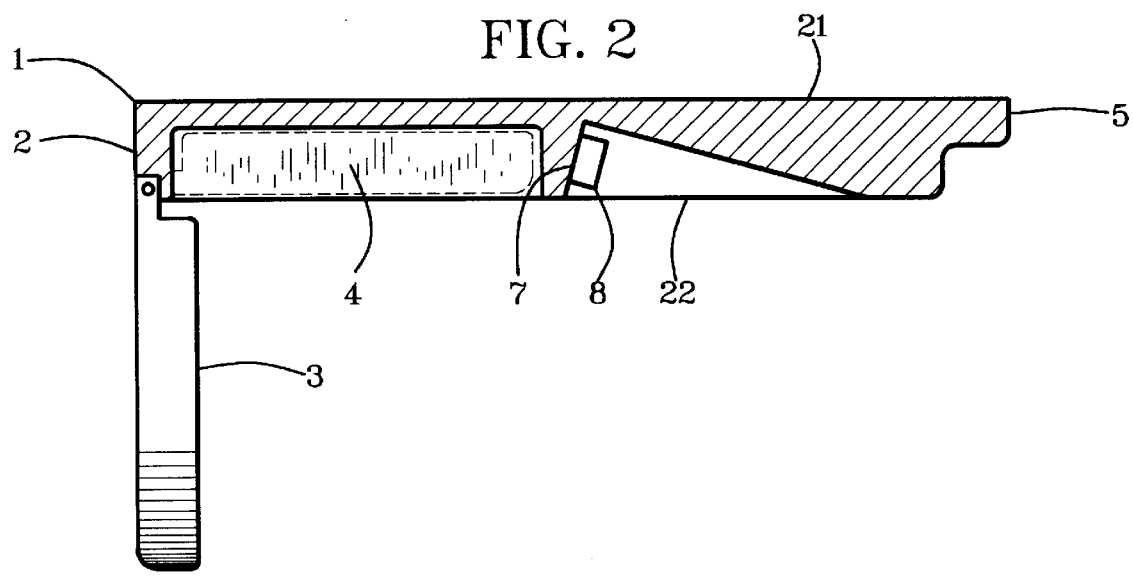
FIG. 2 is a partially cutaway side view.
Figure 3:
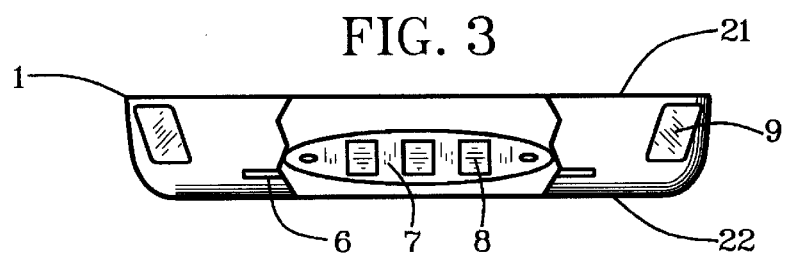
FIG. 3 is a partially cutaway front view.
Figure 4:
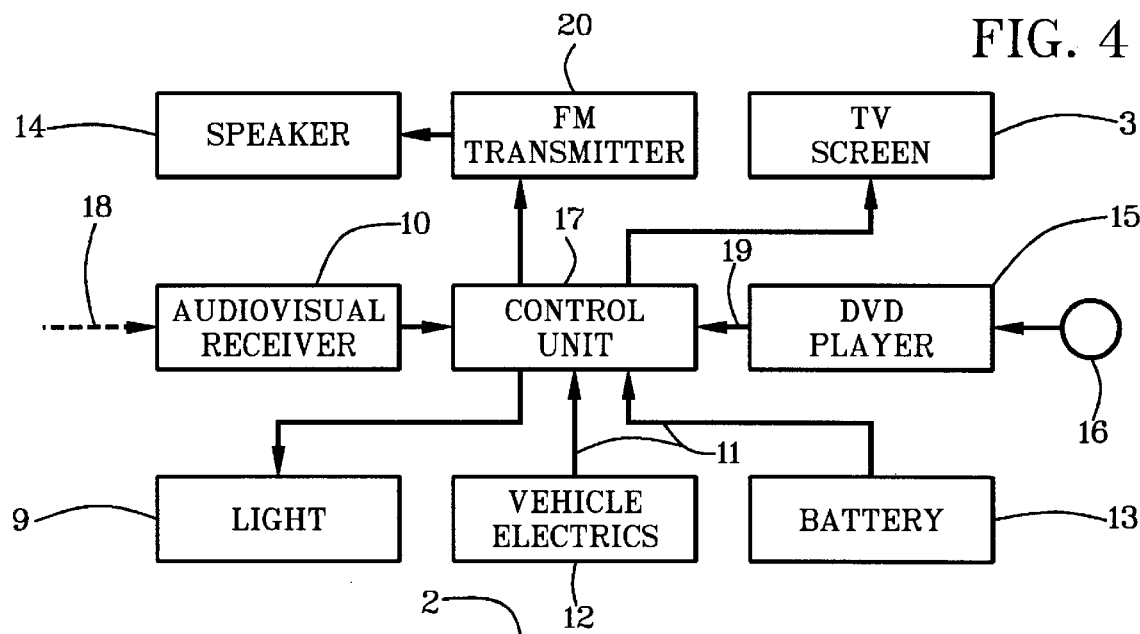
FIG. 4 is a plan diagram.

Reference is made first to FIGS. 1–3. An overhead TV housing 1 has a front edge 2 from which a thin TV screen 3 is pivotal adjustably from a stowage space 4 and has a rear edge 5 with a disc slot 6 for a digital video disc (DVD). A control panel 7 having predetermined control members 8 which are finger operative is positioned in a depression intermediate the stowage space 4 and the disc slot 6. A light 9, preferably adjustable in brightness between reading brightness and dim, is positioned preferably on each side of the TV housing 1.

Referring to FIGS, 1–4, positioned intermediate the stowage space 4 and the disc slot 6 are an audiovisual receiver 10, a power source such as an electrical conveyance 11 from vehicle electrics 12 or a battery 13, a speaker 14, a DVD player 15 for playing digital video discs 16 and a control unit 17.

Audiovisual signaling 18 from broadcast stations or other in-vehicle device, such as a hand-held electronic game, is receivable by the audiovisual receiver 10 and transmitted to the control unit 17. Player audiovisual signaling 19 is receivable from the DVD 16 by the DVD player 15 and transmitted to the control unit 17. Preferably through an FM transmitter 20, audio characteristics of the broadcast audiovisual signaling 18 and audio characteristics of the player audiovisual signaling 19 are directed to the speaker 14 by the control unit 17 selectively. Visual characteristics of the broadcast audiovisual signaling 18 and visual characteristics of the player audiovisual signaling 19 are directed to the TV screen 3 by the control unit 17 selectively.

Preferably, electrical current provided to the control unit 17 by the vehicle electrics 12 and/or the battery 13 is transmitted controllably to the speaker 14, the FM transmitter 20, the TV screen 3, the audiovisual receiver 10, the DVD player 15 and the light 9.

Width, length and thickness of the TV housing 1 can be sums of dimensions of intervening components. Accordingly, the overhead TV housing 1 has a predetermined thickness from a top overhead base 21 to an overhead bottom 22 that can be relative to size of the TV screen 3, the DVD player 15, the control unit 17 and other components. For most uses the TV screen 3 is six-to-eight inches across. The overhead TV housing is approximately eight inches wide, seventeen inches long and one-and-one-half inches thick at largest of these dimensions. With preferably rounded corners, the shape is generally oval as depicted in FIG. 1.

Figure 5:
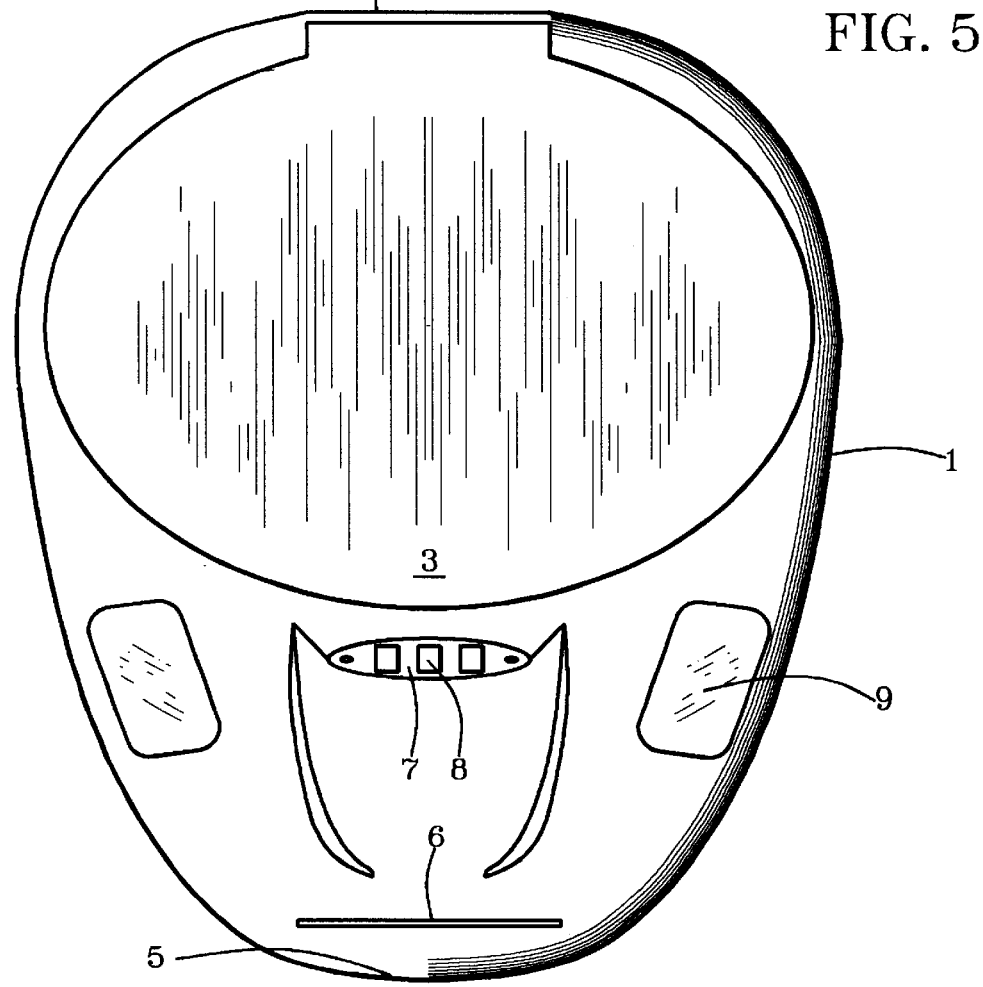
FIG. 5 is a bottom view of an optional embodiment having a relatively large TV screen.

Alternatively as depicted in FIG. 5, the TV screen 3 can be wider in proportion to the disc slot 6 for some applications. This results in a teardrop shape of the TV housing 1. The opposite relationship also is foreseeable. The TV screen 3 can be narrower in proportion to the disc slot 6. Further optional, the disc slot 6 can be smaller for possible advances in miniaturization of the electronics involved. This can result in a small enough TV housing 1 to allow a plurality of them to be positioned for close vision by separate individual passengers. Structure for positioning a plurality of digital-video-disc vehicle televisions in vehicles for individual passengers is a major objective in addition to its singular positioning. Sizes can be optimized for intended uses accordingly.

The TV screen 3 is preferably a TFT color monitor that is flat and has an active matrix.

The rearwardly-facing control panel 7 is preferably backlit and positioned in an indentation or valley where it is visible from a viewing end at the rear edge 5 of the TV housing 1.

Owing to currently rapid changes in technical detail of the components of this invention, its features are characterized generically by function instead of according to detail of either. The speaker 14, the FM transmitter 20, the TV screen 3, the audiovisual receiver 10, the control unit 17, the DVD player 15 and the digital video disc 16 in particular, therefore, are described or otherwise characterized to include substitutions of equivalents.

The stowage space 4 can be proportional to size and configuration of the TV screen 3. For an orthogonally walled TV screen 3 as depicted in FIG. 2, the stowage space 4 can be a matching cup-like or dish-like bay as in FIG. 2. A back side of the TV screen 3, however, can be convex to contain necessary electronics and electrics. This permits a foreseeable flat stowage space 4 in combination with matching convex contouring of the TV housing 1. Hence the characterization of the stowage space 4 as a space instead of a well, cup, dish, bay or other concave configuration.

A new and useful digital-video-disk vehicle television having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A digital-video-disc vehicle television comprising:

an overhead TV housing having a front edge from which a thin TV screen is pivotal adjustably from a stowage space and having a rear edge with a disc slot for a digital video disc;

an audiovisual receiver, a power source, a speaker, a DVD player and a control unit intermediate the stowage space and the disc slot;

audiovisual signaling being receivable from remote broadcasting sources by the audiovisual receiver;

player audiovisual signaling being receivable from the digital video disc by the DVD player;

audio characteristics of the broadcast audiovisual signaling and audio characteristics of the player audiovisual signaling being directed to the speaker by the control unit selectively;

visual characteristics of the broadcast audiovisual signaling and visual characteristics of the player audiovisual signaling being directed to the thin TV screen by the control unit selectively;

a control panel positioned proximate the control unit;

the control panel having predetermined finger-operative control members in predetermined control communication with predetermined features of the control unit;

the overhead TV housing having a predetermined thickness from a top overhead base to an overhead bottom;

the overhead TV housing having a predetermined length from the front edge to the disc slot; and the overhead TV housing having a predetermined side-to-side width.

2. The digital-video-disc vehicle television of claim 1, wherein:

the length of the overhead TV housing is proximate a sum of a front-to-rear length of the stowage space, a front-to-rear length the DVD player, a front-to-rear length of a pivot support for the TV screen proximate the front edge of the overhead TV screen, a front-to-rear length of a control space for the control unit, and end-wall thicknesses of the overhead TV housing.

3. The digital-video-disc vehicle television of claim 2, wherein:

the side-to-side width of the overhead TV housing is a sum of a side-to-side width of the stowage space and side-wall thicknesses of the overhead TV housing; and the side-to-side width of the overhead TV housing being at least as great as a side-to-side width of the DVD player.

4. The digital-video-disc vehicle television of claim 3, wherein:

the length of the overhead TV housing is approximately fifteen inches; and the width of the overhead TV housing is approximately eight inches.

5. The digital-video-disc vehicle television of claim 3, wherein:

the overhead TV housing has rounded corners.

6. The digital-video-disc vehicle television of claim 5, wherein:

the overhead TV housing has rounded sides and rounded ends.

7. The digital-video-disc vehicle television of claim 6, wherein:

the overhead TV housing is substantially oval-shaped.

8. The digital-video-disc vehicle television of claim 3, wherein:

the TV screen and the stowage space have side-to-side widths that are substantially greater than a side-to-side width of the DVD player.

9. The digital-video-disc vehicle television of claim 8, wherein:

the overhead TV housing has an approximately teardrop shape with arcuately blended sides, ends and corners.

10. The digital-video-disc vehicle television of claim 1, wherein:

the thickness of the overhead TV housing at its thickest portion is a sum of a top-to-bottom thickness of the DVD player, a predetermined space for the control unit and thickness of a top wall and a bottom wall of the overhead TV housing.

11. The digital-video-disc vehicle television of claim 1, wherein:

the TV screen is flat.

12. The digital-video-disc vehicle television of claim 1, wherein:

the TV screen is a TFT color monitor with an active matrix.

13. The digital-video-disc vehicle television of claim 1, wherein:

the TV screen has a predetermined shape for design preferences.

14. The digital-video-disc vehicle television of claim 1, wherein:

the control unit includes electric circuitry intermediate the control unit and electrically operative components of the digital-video-disc television.

15. The digital-video-disc vehicle television of claim 1, wherein:

the control unit has an FM transmitter for FM processing of the audio characteristics that are transmitted to a vehicle component.

16. The digital-video-disc vehicle television of claim 1, wherein:

the control panel includes a panel wall that faces rearwardly intermediate the stowage space and the disc slot.

17. The digital-video-disc vehicle television of claim 16, wherein:

the control panel is backlit.

18. The digital-video-disc vehicle television of claim 1, wherein:

the power source includes an electrical conveyance of electrical current intermediate the control unit and vehicle electrics.

19. The digital-video-disc vehicle television of claim 1, wherein:

the power source includes an electrical storage battery with an electrical conveyance intermediate the control unit and the electrical storage battery.

20. The digital-video-disc vehicle television of claim 1 and further comprising:

at least one electric light positioned proximate a bottom surface of the overhead TV housing.

21. The digital-video-disc vehicle television of claim 20, wherein:

the electric light has brightness that is adjustable between a high reading-light brightness and a dim brightness.

22. The digital-video-disc vehicle television of claim 20, wherein:

electrical current for powering the electric light is routed from the control unit to the electric light.

* * * * *

(12) INTER PARTES REEXAMINATION CERTIFICATE (0108th)
United States Patent
Allan et al.

(10) Number: US 6,339,455 C1
(45) Certificate Issued: Nov. 10, 2009

(54) DIGITAL VIDEO DISC VEHICLE TELEVISION

(75) Inventors: William L. Allan, Ocala, FL (US); Ervin R. Pilarczyk, Ocala, FL (US)

(73) Assignee: In Vision Enterprises, Inc., Belleview, FL (US)

Reexamination Request:
No. 95/000,007, Dec. 16, 2002

Reexamination Certificate for:
Patent No.: 6,339,455
Issued: Jan. 15, 2002
Appl. No.: 09/474,582
Filed: Dec. 29, 1999

(51) Int. Cl.
*H04H 1/00* (2006.01)
*B06R 11/02* (2006.01)
*B06R 11/00* (2006.01)

(52) U.S. Cl. .................. 348/837; 348/836; 312/7.2; 312/223.1; 296/37.7; 296/37.8

(58) Field of Classification Search .................. 348/836, 348/837; 312/7.2, 248, 223.1; 296/37.7, 37.8; 352/132; 250/221; 381/685
See application file for complete search history.

(56) References Cited

U.S. PATENT DOCUMENTS

| | | | | |
|---|---|---|---|---|
| 4,100,372 A | * | 7/1978 | Hypolite | 381/1 |
| 4,677,607 A | * | 6/1987 | Ejiri | 720/624 |
| 5,061,996 A | * | 10/1991 | Schiffman | |
| 5,534,891 A | * | 7/1996 | Takano | 345/169 |
| 5,566,290 A | * | 10/1996 | Silverbrook | 345/473 |
| 5,822,023 A | | 10/1998 | Suman et al. | |
| 5,822,547 A | * | 10/1998 | Boesch et al. | 710/302 |
| 5,927,784 A | | 7/1999 | Vitito | |
| D413,856 S | * | 9/1999 | Scribner | D12/418 |
| 5,986,634 A | * | 11/1999 | Alioshin et al. | 345/649 |
| 6,161,944 A | * | 12/2000 | Leman | 362/276 |
| 6,181,387 B1 | * | 1/2001 | Rosen | 348/837 |
| 6,304,173 B2 | | 10/2001 | Pala et al. | |
| 6,339,455 B1 | | 1/2002 | Allan et al. | |
| 6,339,696 B1 | * | 1/2002 | Chan et al. | 455/62 |
| 6,590,508 B1 | * | 7/2003 | Howell et al. | 341/22 |
| 6,704,495 B1 | * | 3/2004 | Kumazawa et al. | 386/126 |

FOREIGN PATENT DOCUMENTS

| | | | |
|---|---|---|---|
| EP | 0784400 A2 | * | 7/1997 |
| WO | WO 00/38951 | * | 7/2000 |

OTHER PUBLICATIONS

Taylor, Jim, "DVD–Video: Multimedia for the Masses", Multimedia, IEEE, vol. 6, Issue 3, Jul.–Sep. 1999.*

* cited by examiner

*Primary Examiner*—Linh M. Nguyen

(57) ABSTRACT

A digital-video-disc vehicle television has a thin ceiling-mountable TV housing (1) having a front edge (2) from which a preferably flat TV screen (3) pivots adjustably downward from a stowage space (4) and having a rear edge (5) with a digital video disc (DVD) slot (6). The TV housing is preferably oval-shaped with a major length of about fifteen inches and a major width of about eight inches. Thickness is about one-to-three inches, depending on type and plurality of components it uses. Intermediate the stowage space and the DVD slot are dome lights (9) that preferably are adjustable for reading and a rearward-facing control panel (7) that preferably has pushbutton control and is backlit. Audiovisual signaling (18, 19) is received selectively from remote or in-vehicle broadcasting sources and from the DVD player (15) and transmitted to a speaker (14) and to the TV screen as controlled by a control unit (17). An FM transmitter (20) is employed to enhance sound received from audio characteristics of the audiovisual signaling and transmitted to the speaker.

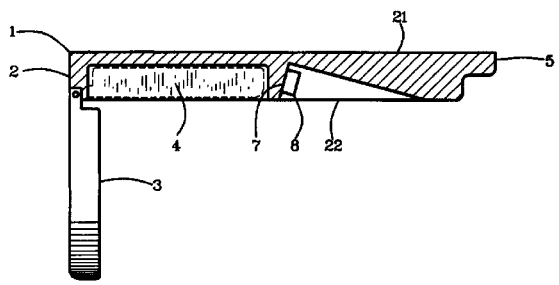
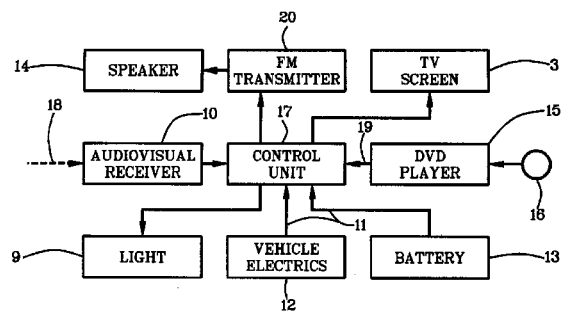

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–22 are cancelled.

* * * * *